United States Patent
Slaughter et al.

(10) Patent No.: US 7,152,467 B2
(45) Date of Patent: Dec. 26, 2006

(54) PARALLEL SEISMIC DEPTH TESTING USING A CONE PENETROMETER

(76) Inventors: Scott H. Slaughter, 1263 Dominion Dr. West, Mobile, AL (US) 36695; Larry Olson, 24336 Winder Pl., Golden, CO (US) 80403

( * ) Notice: Subject to any disclaimer, the term of this patent is extended or adjusted under 35 U.S.C. 154(b) by 0 days.

(21) Appl. No.: 10/802,625

(22) Filed: Mar. 17, 2004

(65) Prior Publication Data

US 2005/0204809 A1   Sep. 22, 2005

(51) Int. Cl.
*E21B 47/04*   (2006.01)
*G01B 17/00*   (2006.01)

(52) U.S. Cl. ............... 73/152.58; 702/158; 702/166; 175/40

(58) Field of Classification Search ............ 73/152.16, 73/152.58; 367/86; 702/158, 166; 175/40
See application file for complete search history.

(56) References Cited

U.S. PATENT DOCUMENTS

| | | | |
|---|---|---|---|
| 4,365,306 A | 12/1982 | House et al. | |
| 5,177,709 A | * 1/1993 | Baziw | ............ 367/38 |
| 5,432,305 A | * 7/1995 | Nelson | ............ 181/101 |
| 5,726,349 A | 3/1998 | Palmertree et al. | |
| 5,996,414 A | * 12/1999 | Mercado | ............ 73/594 |

FOREIGN PATENT DOCUMENTS

| | | |
|---|---|---|
| GB | 2 251 943 A | 7/1992 |
| SU | 958 585 A | 9/1982 |

\* cited by examiner

*Primary Examiner*—Daniel S. Larkin
(74) *Attorney, Agent, or Firm*—Macheledt Bales & Heidmiller LLP; Jennifer L. Bales

(57) ABSTRACT

A parallel seismic tester utilizing a cone penetrometer to test the depth of a foundation or the like comprises three important elements: the cone penetrometer which houses a receiver, an impactor to impact the structure, and data gathering and analyzing equipment. The receiver may comprise a hydrophone, a geophone, or accelerometers. In the case where the receiver is a hydrophone, the hydrophone is embedded in a plastic, water filled container within the cone penetrometer head, and the head retracts prior to running tests.

14 Claims, 3 Drawing Sheets

PS TEST SETUP

PARALLEL SEISMIC DEPTH TESTING USING A CONE PENETROMETER

BACKGROUND OF THE INVENTION

1. Field of the Invention

The present invention relates to apparatus and methods for testing the depth of structures such as foundations using parallel seismic testing with a cone penetrometer to house the receiving element.

2. Description of the Prior Art

Parallel Seismic (PS) testing has been employed for such uses as determining the depth of an unknown foundation when the foundation top is not accessible or when the piles are too long and slender to be tested by echo techniques. Typically a borehole is drilled into the soil adjacent to the foundation, and the borehole is cased. In the case where the receiver is a hydrophone, the cased borehole is filled with water. In the case where the receiver is a geophone, several geophone receiver components are spaced apart in the borehole.

An exposed portion of the foundation is then impacted with a hammer or the like, and compression or flexural waves travel down the foundation and are transmitted into the surrounding soil. The receiver detects the transmitted signals. The depth of the foundation is indicated by a weaker and slower signal arrival below the tip of the foundation.

Parallel seismic testing is expensive and time consuming because the borehole must be drilled and cased (or at least braced in the case of a geophone receiver).

Cone penetrometers have been used to test soil conditions. For example, Hogentogler & Co., Inc. builds a variety of commercially available cone penetrometer testers (CPTs) such as their Electronic Subtraction Cone CPTs. These units include cone tips each housing a strain gauge transducer and electronics for computing the detected strain and providing it to the user. Tips housing other transducers are also available. The CPT is mounted on a truck or track system, which includes, for example, hydraulic cylinders for driving the CPT cones into the earth.

A need remains in the art for apparatus and methods for doing parallel seismic testing in a quicker, more convenient manner.

SUMMARY

The present invention comprises three important elements:
(1) a cone penetrometer which houses a receiver;
(2) an impactor to impact the structure; and
(3) data gathering and analyzing equipment.

In the case where the receiver is a hydrophone, the hydrophone is embedded in the cone penetrometer head, and is exposed to water by a retractable sleeve or openings in the penetrometer casing prior to running tests. In the case where the receiver is a geophone or accelerometers, the retracting or perforated outer casing is not required.

DETAILED DESCRIPTION OF THE PREFERRED EMBODIMENT

Figure 1:
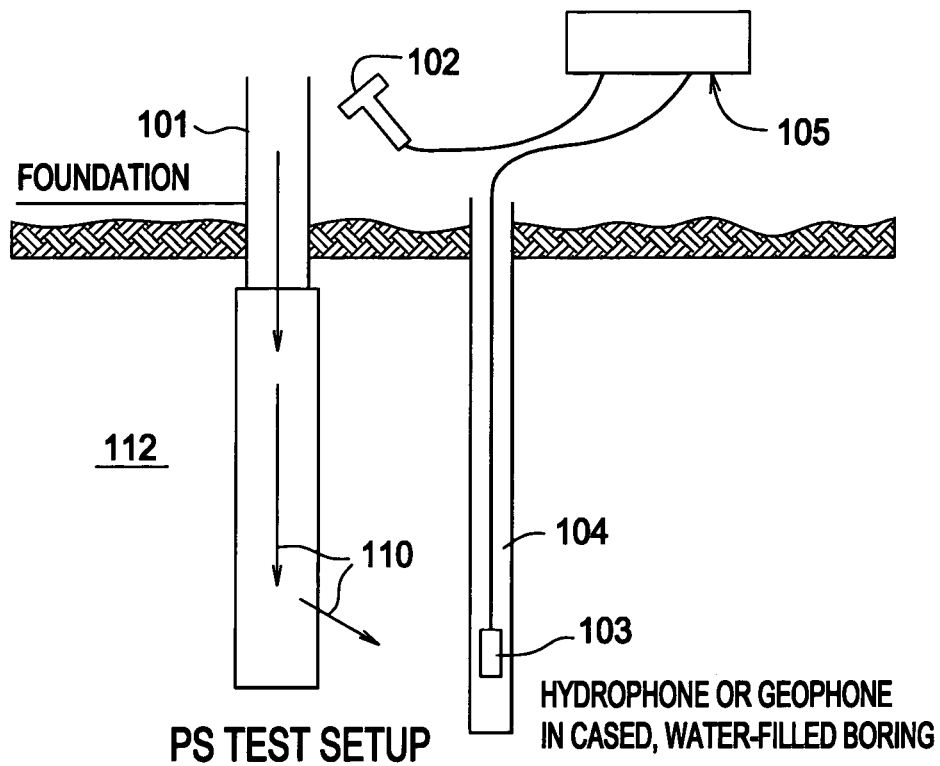
FIG. 1 (prior art) is a side schematic view of a conventional parallel seismic testing device.

FIG. 1 (prior art) is a side schematic view of a conventional parallel seismic testing device. Foundation 101 (or some element connected to the top of the foundation, such as a pile cap) is impacted by impactor 102 (a hammer or the like). Impact hammer 102 is typically an instrumented three pound hammer producing 2000–5000 pounds of force. The instruments record (among other things) the impact time ($T_0$) of the impactor, so that the propagation time of waves 110 can be measured. An alternative hammer 102 might comprise a steel sledge hammer, three to eight pounds, with an accelerometer mounted next to the impact location to record the impact time.

Compressional, shear, or flexural waves 110 travel down through foundation 101 and are transmitted into the surrounding soil 112. Borehole 104 is drilled out and the drill bit removed. Borehole 104 may be cased or braced. Receiver 103 is lowered into borehole 104. Borehole 104 must be cased if receiver 103 is a hydrophone, because it is filled with water. It may be cased or otherwise braced if receiver 103 is a geophone, to prevent soil from caving in. The transmitted signals are received by receiver 103 and provided to a processor 105.

Processor 105 analyses the signals in the time domain and identifies direct arrival times of compression and shear waves, as well as their amplitudes. Generally the tests are performed every one to three feet within bore hole 104. Parallel seismic tests can be performed on concrete, wood, masonry, and steel foundations. Processor 105 is typically a computerized data collection system capable of collecting time domain waveforms at a sample rate of 20 microseconds per point or faster. Typical data traces are 1000–4000 points long, with one set of traces collected per hammer impact. Typically, a sets of tests are performed at each probe depth, with all waveforms averaged together (about two to eight waveforms) to complete one test set per probe depth. A test set would consist of an averaged impact time trace (for the signal start time) and an averaged receiver time trace.

Figure 2:
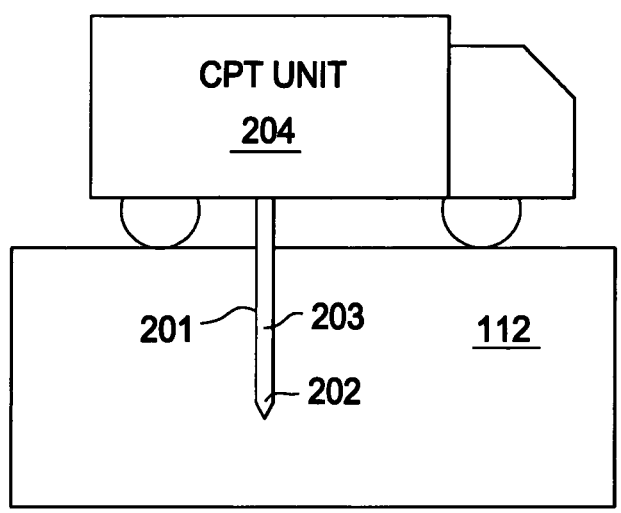
FIG. 2 (prior art) is a side schematic view of a conventional cone penetrometer.

FIG. 2 (prior art) is a side schematic view of a conventional cone penetrometer tester (CPT) 201. CPT unit 204 is a van which houses and transports the CPT equipment 201, including hydraulic cylinders, mounted on a framework, driving push rods 203, which are threaded together as needed to achieve the desired depth. Push rods 203 drive the CPT cones (probe tips) 202 into the earth 112. Instrumented cone 202 is driven into the soil 112 to be tested. The instruments might determine pore pressure, tip resistance, and sleeve resistance for bearing and skin friction value determination. CPT 201 can also be used in a seismic piezocone test, wherein the earth is impacted and compressional and shear wave energy is measured by accelerometers or geophones in the cone. A plastic casing can be installed by pushing a dummy tip to the desired location, and then leaving the internal casing in the ground as the rods 203 are withdrawn.

Figure 3:
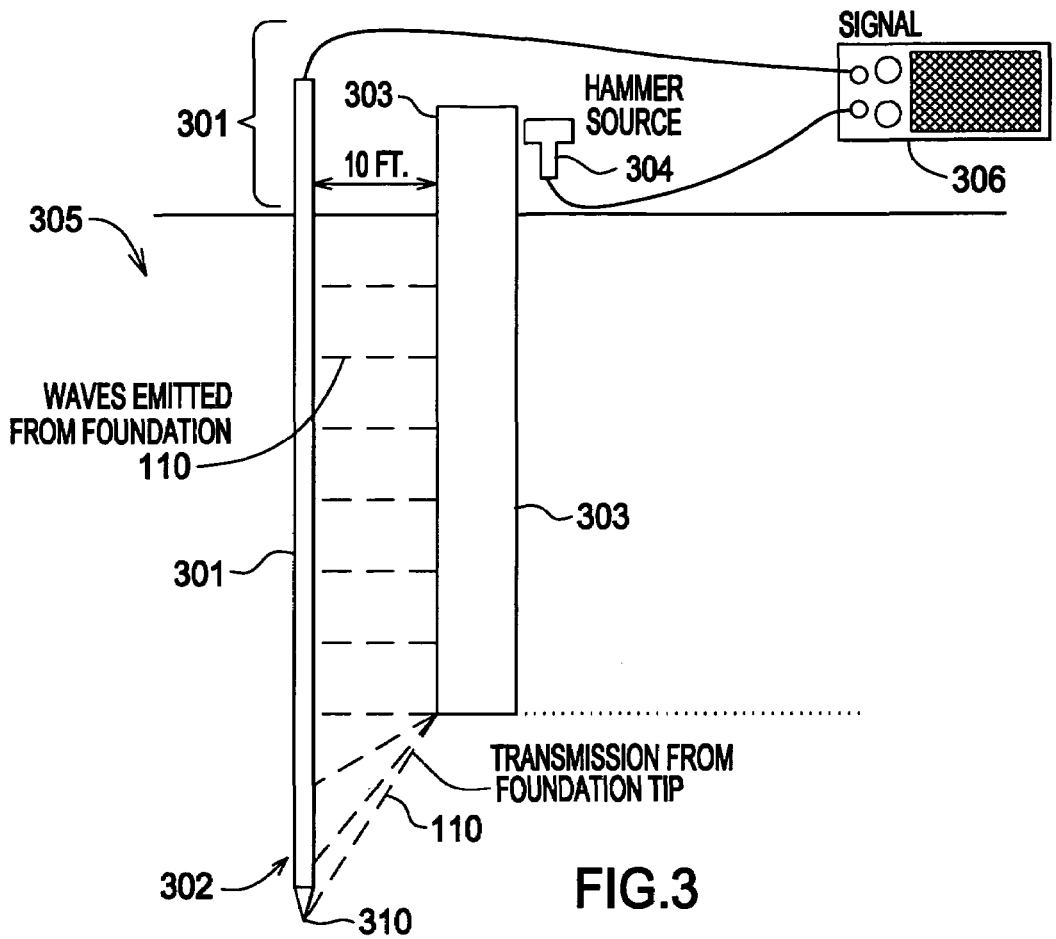
FIG. 3 is a side schematic view of a parallel seismic testing device utilizing a cone penetrometer according to the present invention.

FIG. 3 is a side schematic view of a parallel seismic testing device utilizing a cone penetrometer 301 according to the present invention. Rather than drilling a borehole and casing or bracing it, the cone penetrometer directly delivers the receiver 302 to the right depth. The cone 310 housing receiver 302 is steadily driven into the soil generally parallel to the shaft 303 to be measured. In this patent, the terms "shaft" and "foundation" are used interchangeably, and are defined to include foundations, piles, piers, caissons, footings, or other element of which the depth is to be measured. The shaft to be measured is typically formed of concrete, timber, steel, and/or masonry.

In one specific embodiment which has been implemented, a Hogentogler & Co. Electronic Subtraction Cone including a Seismic Electronic Cone Penetrometer was pushed into soil adjacent to a foundation element to be tested with a Hogentogler CPT unit mounted on Caterpillar tracks. The CPT used two double acting hydraulic cylinders coupled by a platen that pushed and pulled the push rods connected to the cone.

Periodically, as the cone 310 is being driven downward into the soil, foundation 303 is impacted by impactor 304 (a hammer or the like). Compressional, shear, or flexural waves 110 travel down through foundation 303 and are transmitted into the surrounding soil 305. The transmitted signals are received by receiver 302 and provided to a processor 306. Processor 306 analyses the signals in the time domain and identifies direct arrival times of compression and shear waves, as well as their amplitudes.

Figure 4A:
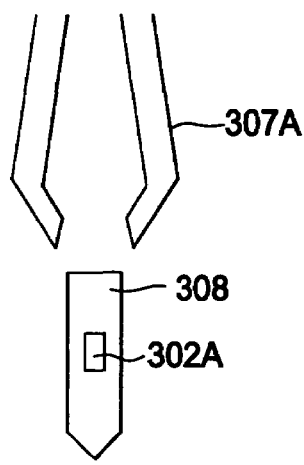
FIGS. 4A–4C show preferred embodiments of the tester of FIG. 3, with a variety of receivers.

FIG. 4A shows a side schematic drawing illustrating one preferred embodiment of testing device 301, which utilizes a hydrophone 302A for receiver 302. Periodically during the time cone 310 is being driven into the soil, the pushing element pauses and allows metal cone penetrometer tip 307A to open and withdraw slightly to uncover plastic inner casing 308. Inner casing 308 is filled with water surrounding hydrophone 302A. Shaft 303 is impacted and hydrophone 302A measures the arrival time of the generated waves in the soil. Then tip 307A lowers and surrounds casing 308 and cone 310 continues its journey into the soil.

Figure 4B:
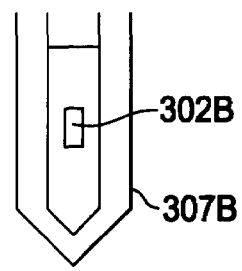
Figure 4C:
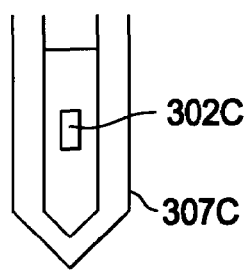

FIG. 4B shows a second embodiment which utilizes a geophone 302B as the tip transducer to act as the receiver. A geophone measures movement or vibrations of the surrounding earth, for example by using the motion of a spring supported coil in the field of a permanent magnet to generate an output signal. FIG. 4C illustrates a third embodiment of the present invention which includes an accelerometer 302C as a receiver. An accelerometer measures acceleration, for example by measuring the displacement of a mass connected to a spring. In the case where a geophone or an accelerometer is used, tip 307B, 307C does not generally need to be retracted while the measurement is made. The movement (pushing) of cone 310 may be paused while each measurement is made, or the measurements may be taken while the cone is moving.

In all cases, receiver 302 is detecting the arrival of waves 110 which have travelled down shaft 303 and transmitted through the soil. The amount of time between the impact and the detection of the wave is used to detect where the shaft ends, as is shown in FIG. 5.

Figure 5C:
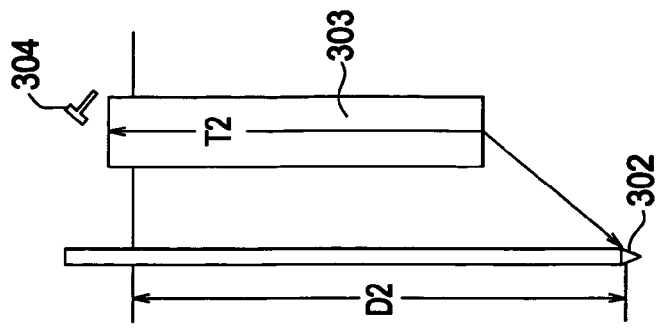
FIGS. 5B and 5C illustrate two data points in the plot of FIG. 5A.
Figure 5B:
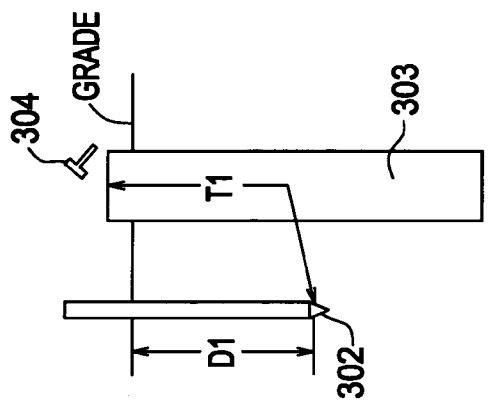
Figure 5A:
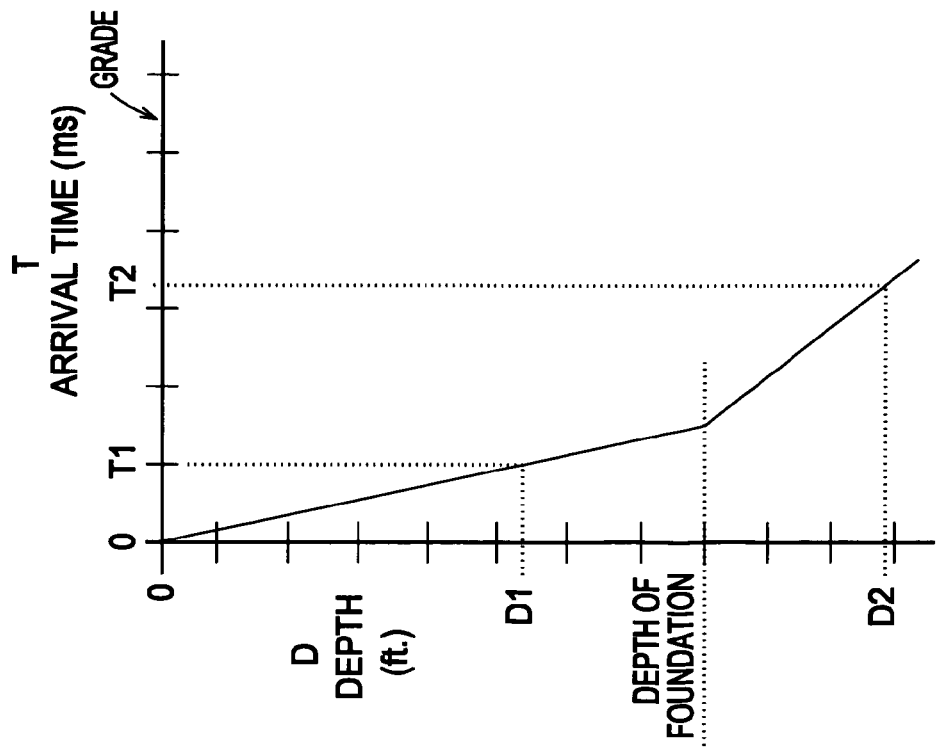
FIG. 5A is a plot of sample data received by the processor of the tester of FIG. 3.

FIG. 5A is a plot of sample data received by processor 306. Arrival time T increases slowly with depth until the end of foundation 303 is reached. Then arrival time increases much more quickly. As shown in FIG. 5B, time T1 is measured before the end of the shaft is reached, so it is on the shallow part of the curve. As shown in FIG. 5C, time T2 is measured after tip 302 has extended beyond the end of the shaft, so it is on the steep part of the the curve. Other analysis may also be performed, including amplitude and phase of signals sensed above, at and below the foundation bottom to determine its depth.

What is claimed is:

1. A method for measuring the depth of a preexisting shaft comprising the steps of:
   a) driving a cone containing a transducer into soil near the preexisting shaft;
   b) periodically while driving the cone, striking the shaft to generate waves such that the waves propagate down the shaft and through the soil;
   c) detecting the waves in the soil with the transducer;
   d) measuring the time between striking the shaft and detecting the waves;
   e) computing the depth of the end of the shaft based upon the measured times.

2. The method of claim 1 wherein step b) generates at least one of the following type of wave: compressional, shear, flexural.

3. The method of claim 1 wherein the transducer is a hydrophone within a casing filled with water and wherein step a) includes the following sub-steps:
   a1) pausing the driving while step b) is performed;
   a2) withdrawing the tip of the cone from around the casing prior to performing step b); and
   a3) replacing the tip around the casing after performing step b).

4. The method of claim 1 wherein the transducer is a geophone.

5. The method of claim 4 wherein step a) includes the sub-step of pausing the driving while step b) is performed.

6. The method of claim 1 wherein the transducer is a accelerometer.

7. The method of claim 6 wherein step a) includes the sub-step of pausing the driving while step b) is performed.

8. The method of claim 1 wherein the depth of the shaft is determined in step d) by examining a plot of time (between striking the shaft and detecting the waves) versus depth (of the cone) and noting where the plot changes slope.

9. Apparatus for measuring the depth of a preexisting shaft comprising:
   a transducer of the type which detects waves in soil;
   a cone housing the transducer;
   an element for driving the cone containing the transducer into soil near the preexisting shaft;
   an impactor for periodically striking the shaft as the cone reaches a plurality of depths to generate waves, such that the waves propagate down the shaft and through the soil to the transducer;
   electronics connected to the transducer for providing a signal based upon the detected waves; and
   a processor in communication with the electronics for measuring the times between the impactor strikes and wave detection, the processor calculating the depth of the shaft based upon the measured times.

10. The apparatus of claim 9 wherein the transducer detects at least one of the following type of wave: compressional, shear, flexural.

11. The apparatus of claim 9 wherein the transducer is a hydrophone within a casing filled with water and wherein the cone includes a mechanism for withdrawing the tip of the cone from around the casing prior to the periodic impactor strikes and for replacing the tip around the casing after the impact strikes.

12. The apparatus of claim 9 wherein the transducer is a geophone.

13. The apparatus of claim 9 wherein the transducer is a accelerometer.

14. Apparatus for measuring the depth of a preexisting shaft comprising:

a transducer for detecting waves;

means for driving the transducer into soil near the preexisting shaft;

means for striking the shaft periodically while driving the transducer to generate waves such that the waves propogate down the shaft and through the soil to the transducer;

means for measuring the time between the periodic striking of the shaft and subsequent detecting of the waves;

means for computing the depth of the end of the shaft based upon the measured times.

\* \* \* \* \*